No. 793,928. PATENTED JULY 4, 1905.
W. E. HARKNESS.
TELEPHONE TRANSMITTER.
APPLICATION FILED MAR. 18, 1904.
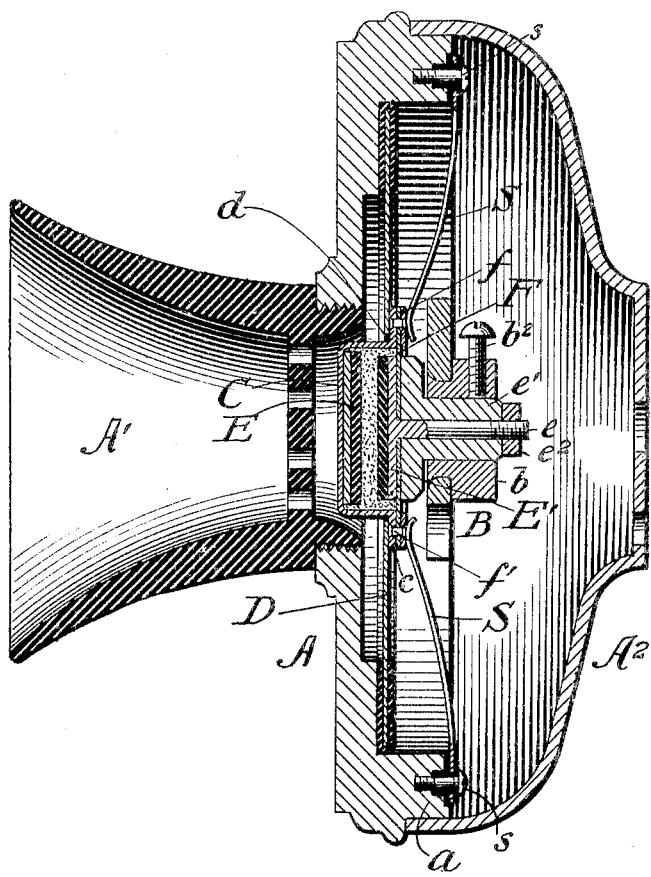

No. 793,928. Patented July 4, 1905.

UNITED STATES PATENT OFFICE.

WILLIAM E. HARKNESS, OF ELYRIA, OHIO, ASSIGNOR TO THE DEAN ELECTRIC COMPANY, OF ELYRIA, OHIO, A CORPORATION OF OHIO.

TELEPHONE-TRANSMITTER.

SPECIFICATION forming part of Letters Patent No. 793,928, dated July 4, 1905.

Application filed March 18, 1904. Serial No. 198,785.

*To all whom it may concern:*

Be it known that I, WILLIAM E. HARKNESS, a citizen of the United States, residing at Elyria, in the county of Lorain and State of Ohio, have invented a certain Improvement in Telephone-Transmitters, of which the following is a specification.

My invention relates to telephone-transmitters, and particularly to those known as "granular" transmitters, wherein finely-divided carbon or other semiconducting material is placed between a pair of electrodes, one of which is fixed and the other free to vibrate.

It is the object of my invention to produce an instrument of this type which shall be simple to manufacture, easy to assemble, and highly efficient in operation.

The type of transmitter now most commonly used is that known as the "solid-back," wherein the electrodes are inclosed within a comparatively small containing-chamber usually supported between the diaphragm and the transverse bridge, to the rear thereof. The back electrode is seated in the cup or chamber, which is supported by a stud passing through the bridge and rigidly clamped therein. The front electrode is centrally secured to the diaphragm by a short threaded stem and suitable nuts, being connected with the side walls of the cup by an auxiliary diaphragm, of mica, the latter being clamped both centrally and peripherally. Such instruments are fairly efficient if properly made and carefully adjusted; but they have some defects which in practice often prove very serious. One of these is the liability to pack, this resulting from the fact that the containing-chamber for the carbon is rigidly held, so that movements of the front electrode have a tendency to gradually force down the granular contents of the chamber in a more or less compact mass, which does not respond to sound-vibrations by any substantial alteration in resistance. Another defect resides in the indirect connection of the diaphragm with the movable electrode, whereby losses are experienced which affect principally the quality and timbre of the tones transmitted. These and other defects not specifically referred to are avoided in the instrument I have designed and which I present herewith. In this instrument I reverse the usual arrangement of the resistance chamber or "button," causing the chamber itself to rest against and vibrate with the main diaphragm, the fixed electrode being in this case the piston-electrode, connected to the periphery of the vibrating cup by a mica diaphragm, through which also the cup or chamber may be said to be supported independently of the main diaphragm. In order to avoid any intermediate connection between the diaphragm and cup, I provide a central opening or perforation in the diaphragm and set the cup therein, so that its peripheral flange will rest upon the inner face of the diaphragm. In this position the cup is maintained by two or more springs, which have the triple function of so maintaining the cup in position, completing the circuit thereto, and damping any excessive vibration in the diaphragm. I thus make my cup or chamber virtually a part of the diaphragm or vibrating member of the transmitter. Its constant agitation prevents packing of the granular carbon, its direct exposure to waves of sound insures sensitiveness, while the character of the parts makes them simple to manufacture and easy to assemble.

My invention is illustrated in the accompanying drawing, wherein the figure is a sectional view of a microphone-transmitter in which the invention is embodied.

Referring to the drawing, A is a circular metal front plate provided with a central opening screw-threaded for the reception of the mouthpiece A' and provided also with a peripheral flange $a$, to which is secured the usual cover or shell $A^2$. Lying within the flange $a$ and insulated from the front plate by an elastic rubber band stretched around its edge is the diaphragm D. To the rear of the diaphragm and secured at its ends upon the flange $a$ is the bridge B, provided with a central apertured boss $b$, carrying a set-screw $b^2$.

The boss $b$ may either be formed integral with the bridge, or, as shown in the drawing, may be made separately and secured thereto. In either case it is accurately drilled, so that the axis of its opening will coincide with the center of a larger opening $d$, formed in the diaphragm D. This opening $d$ receives the cup or chamber C, and the opening in the bridge receives the stud $e'$ of the rear or fixed electrode.

I construct the electrode-chamber as follows: The cup C is formed up in one piece, preferably of aluminium, with a flange $c$ surrounding its open end. Within the cup is seated the electrode E, and upon the flange $c$ rests the mica auxiliary diaphragm F, secured in place by an overlying ring $f$ and rivets $f'$. Secured upon the inner face of this auxiliary diaphragm is the electrode E', carried upon a stem $e$, passing through the hollow stud $e'$ and protruding from the rear end thereof, where it receives a suitable nut $e^2$. The mica diaphragm is clamped between the head of the stud $e'$ and the electrode-disk E', the stem $e$ serving the double purpose of effecting this clamping and of carrying the current to electrode E'. Between the electrodes I insert the usual filling of granular carbon, which extends around the edges of each and in which the electrode E' works as a piston during the vibration of the diaphragm.

The resistance-chamber, with its electrodes, is assembled as a unit before being placed in the instrument. Then in assembling the latter, the diaphragm being in place, the cup C is inserted through the opening $d$, so that the flange $c$ will rest against the inner face of the diaphragm, the bridge B is placed in position and secured, and the instrument is adjusted. In order that the cup may be held against the diaphragm, I provide the springs S, secured to but insulated from the flange $a$ of the plate A by means of bushed screws $s$. The inner ends of these springs rest upon the ring $f$, exerting a degree of pressure thereon which may be regulated by altering the curvature, and thereby the tension of the springs. I have shown two of these springs; but it will be understood that three, four, or more may be employed, and a very important advantage springs from this employment in that the symmetrical arrangement of the springs secures a uniform and symmetrical damping of the diaphragm.

In adjusting this instrument it is only necessary to have the set-screw $b^2$ loose in the boss or collar, when the stud will of itself take up a natural position due to the balance or equilibrium of forces between the springs S and the resilient diaphragm D. This normal position being thus assumed, the screw $b^2$ may be set up tightly to make the adjustment permanent. The circuit through the electrodes is completed as follows: to the springs S, rings $f$, rivets $f'$, and flange $c$, cup C, electrode E, through the granular material to electrode E', stem $e$, and out. One side of this circuit is insulated from the shell of the instrument.

I am aware that it has been proposed to form a resistance-chamber directly in or on the diaphragm of the transmitter and also that it has been proposed to rigidly clamp such a cup or chamber to the diaphragm; but neither of these constructions possesses the points of merit of my arrangement. While my resistance-chamber vibrates with the diaphragm, it is independently supported and is not connected thereto. While it lies within it in a sense, it is not a part of it. While it is possible to cause the chamber accurately to follow every slightest movement of the diaphragm within limits, (this being determined by the limit of flexion of the auxiliary diaphragm,) any sudden or violent disturbance of the main diaphragm would fail to affect the electrode adjustment or to pack the granular carbon.

Having thus described my invention, what I claim, and desire to secure by Letters Patent, is—

1. In a telephone-transmitter, a diaphragm having a central opening, an electrode in said opening supported independently of but adapted to vibrate with the diaphragm, and a second electrode rigidly fixed with respect to the first, substantially as described.

2. In a telephone-transmitter a diaphragm having a central opening, a cup or chamber within said opening and resting against the diaphragm but not carried thereby, an electrode seated in and vibrating with said chamber and the diaphragm, together with a relatively fixed electrode extending into said chamber and working therein after the fashion of a piston, substantially as described.

3. In a telephone-transmitter a diaphragm having a central opening, a cup or chamber in said opening and spring-pressed against the diaphragm to vibrate therewith, electrodes and granular conducting material in said chamber and means for closing the chamber, substantially as described.

4. In a telephone-transmitter a diaphragm having a central opening, a flanged cup resting in said opening but not carried by said diaphragm, with its flange against the diaphragm, an electrode seated in said cup to vibrate therewith and with the diaphragm, a second electrode extending into the cup and held rigid with respect to the first electrode, an auxiliary diaphragm extending about said second electrode and secured to the flange of the cup, and granular material within the cup, substantially as described.

5. In a telephone-transmitter a diaphragm having a central opening, a cup having a flange or shoulder, within the opening and resting against the diaphragm, a pair of springs normally under tension and forcing said cup against the diaphragm, electrodes and granular conducting material in the cup, and means for closing the cup, substantially as described.

6. In a telephone-transmitter, a supporting plate or frame, a diaphragm supported thereon and having a central opening, a bridge across the frame in proximity to the diaphragm, a cup or chamber within the opening and resting against the diaphragm, a pair of springs secured to the frame and holding the cup in position, an electrode in the cup to vibrate therewith, a second electrode supported upon the bridge and extending into the cup in opposition to the first electrode, granular material between the electrodes, and means to confine the same within the cup, substantially as described.

7. In a telephone-transmitter a supporting plate or frame, a diaphragm resting thereon but insulated therefrom and provided with a central opening, a bridge extending across the frame in proximity to the diaphragm, a flanged cup or chamber having its body extending within the opening in the diaphragm and its flange resting thereagainst, a pair of contact-springs secured to but insulated from the frame and resting against the flange of the cup to hold the same in position and also to complete the circuit therethrough, an electrode seated in said cup to vibrate therewith, a second electrode supported upon the bridge and extending into the cup, granular material between the electrodes and means to confine the same within the cup, substantially as described.

8. In a telephone-transmitter, a diaphragm having a central opening, a cup or chamber in said opening adapted to vibrate with said diaphragm, electrodes and granular conducting material in said chamber, and spring-pressure means operating to maintain said cup or chamber against the diaphragm, to damp excessive vibrations of said diaphragm, and to complete the electrical circuit, substantially as described.

In witness whereof I have hereunto set my hand, in the presence of two subscribing witnesses, this 14th day of March, A. D. 1904.

WILLIAM E. HARKNESS.

Witnesses:
 WILLIAM W. DEAN,
 S. W. BRYLAND.